(12) United States Patent
Lewis

(10) Patent No.: US 10,995,477 B2
(45) Date of Patent: May 4, 2021

(54) COUPLER GUARD SYSTEM

(71) Applicant: William Lewis, Plantersville, TX (US)

(72) Inventor: William Lewis, Plantersville, TX (US)

( * ) Notice: Subject to any disclaimer, the term of this patent is extended or adjusted under 35 U.S.C. 154(b) by 153 days.

(21) Appl. No.: 15/910,003

(22) Filed: Mar. 1, 2018

(65) Prior Publication Data
US 2019/0169821 A1 Jun. 6, 2019

Related U.S. Application Data

(60) Provisional application No. 62/465,627, filed on Mar. 1, 2017.

(51) Int. Cl.
*E02F 9/22* (2006.01)
*F16L 57/00* (2006.01)
*E02F 3/36* (2006.01)
*F16L 37/56* (2006.01)

(52) U.S. Cl.
CPC .......... *E02F 9/2275* (2013.01); *E02F 3/3654* (2013.01); *F16L 57/005* (2013.01); *F16L 37/56* (2013.01)

(58) Field of Classification Search
CPC ..... E02F 3/3654; E02F 9/2275; F16L 57/005; F16L 37/56
USPC .............................................. 285/45; 414/723
See application file for complete search history.

(56) References Cited

U.S. PATENT DOCUMENTS

| 5,360,313 | A | * | 11/1994 | Gilmore, Jr. | ............ | E02F 3/301 |
| | | | | | | 403/45 |
| 5,507,530 | A | * | 4/1996 | Mahaney | ............... | E02F 3/3654 |
| | | | | | | 285/124.1 |
| 5,816,621 | A | * | 10/1998 | Frost | ........................ | F16L 37/56 |
| | | | | | | 285/1 |
| 6,301,811 | B1 | * | 10/2001 | Gilmore, Jr. | .......... | E02F 3/3622 |
| | | | | | | 37/468 |
| 6,899,509 | B1 | * | 5/2005 | Mailleux | ............... | E02F 3/3622 |
| | | | | | | 37/468 |
| 7,464,967 | B2 | * | 12/2008 | Mieger | .................... | B60D 1/62 |
| | | | | | | 285/124.1 |
| 7,963,054 | B2 | * | 6/2011 | Wimmer | ............... | E02F 3/3627 |
| | | | | | | 172/272 |
| 8,585,098 | B2 | * | 11/2013 | Lundgren | ............. | E02F 3/3654 |
| | | | | | | 285/124.2 |

(Continued)

FOREIGN PATENT DOCUMENTS

EP 3434828 A1 * 1/2019 ............ E02F 3/3654
WO WO-2018164906 A1 * 9/2018 ............ E02F 3/3627

*Primary Examiner* — David Bochna
(74) *Attorney, Agent, or Firm* — Shannon Warren

(57) ABSTRACT

A coupler guard configured to protect an aux coupler assembly from side impacts in the rough use environment of a loader. The coupler guard comprises an encasement and a side plate. The loader comprises the aux coupler assembly and a hinge extension. The encasement wraps around a top portion and interior side of the aux coupler assembly. The side plate attaches to a portion of the encasement and protect an exterior side portion of the aux coupler assembly. A screw assemblies selectively attaches the encasement to the side plate. A ring attaches to a portion of the side plate. The ring selectively wraps around a portion of the hinge extension of the loader. A ring screw assembly selectively holds the ring and the rest of the coupler guard to the hinge extension. An edge trim selectively sits on top of a portion of a first arm.

5 Claims, 12 Drawing Sheets

(56) References Cited

U.S. PATENT DOCUMENTS

| | | | |
|---|---|---|---|
| 9,458,601 B2 * | 10/2016 | Shipman | E02F 3/386 |
| 2005/0184510 A1 * | 8/2005 | Langenfeld | E02F 3/3654 |
| | | | 285/124.1 |
| 2009/0235561 A1 * | 9/2009 | Muller | E02F 3/3654 |
| | | | 37/468 |
| 2010/0092233 A1 * | 4/2010 | Roan | E02F 3/34 |
| | | | 403/14 |
| 2012/0205907 A1 * | 8/2012 | Westendorf | F16L 37/56 |
| | | | 285/120.1 |

\* cited by examiner

View A-A

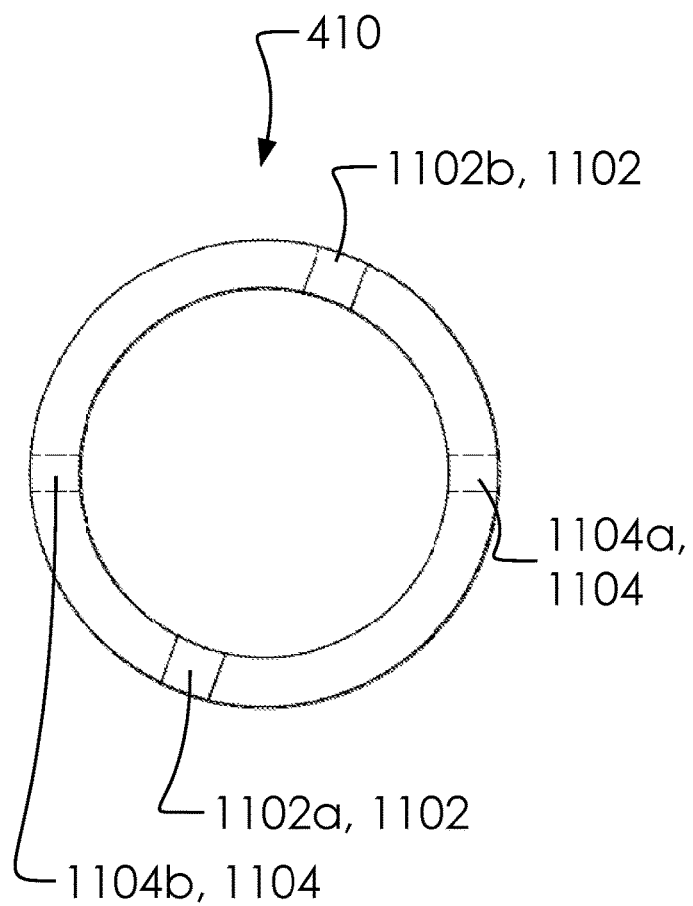
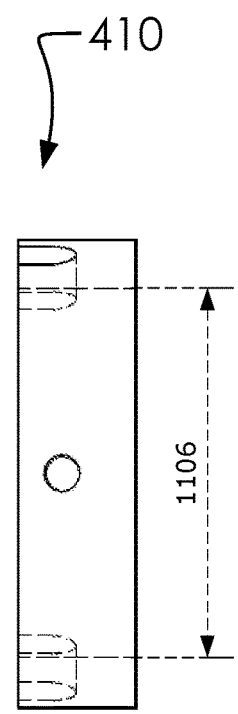
FIG. 11A
FIG. 11B

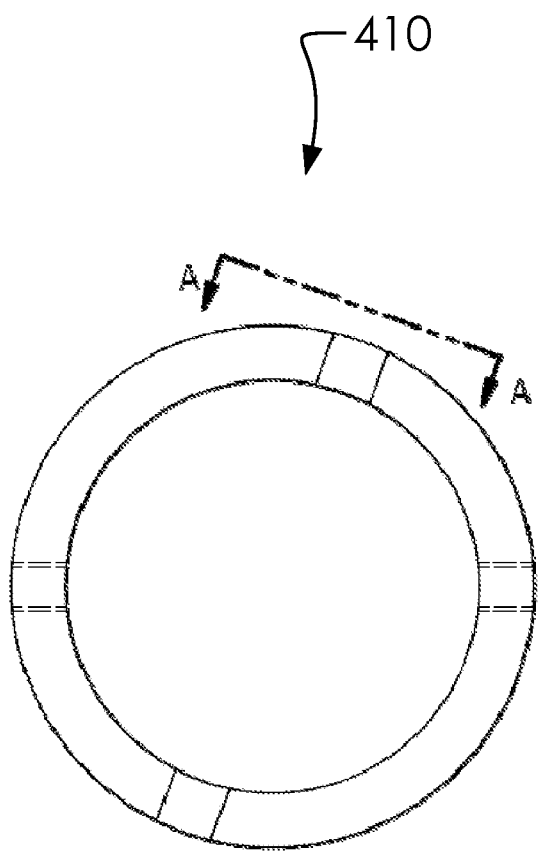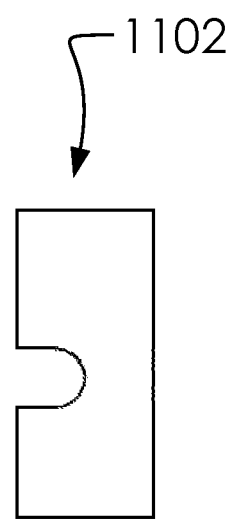
FIG. 12A                    FIG. 12B

COUPLER GUARD SYSTEM

CROSS-REFERENCE TO RELATED APPLICATIONS

This application claims benefit to US Patent Application No. 62/465,627 filed on Mar. 1, 2017.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

No prior art is known to the Applicant
None of the known inventions and patents, taken either singularly or in combination, is seen to describe the instant disclosure as claimed.

BRIEF SUMMARY OF THE INVENTION

A coupler guard configured to protect an aux coupler assembly from side impacts in the rough use environment of a loader. Said coupler guard comprises an encasement and a side plate. Said loader comprises said aux coupler assembly and a hinge extension. Said encasement wraps around a top portion and interior side of said aux coupler assembly. Said side plate attaches to a portion of said encasement and protect an exterior side portion of said aux coupler assembly. A screw assemblies selectively attaches said encasement to said side plate. A ring attaches to a portion of said side plate. Said ring selectively wraps around a portion of said hinge extension of said loader. A ring screw assembly selectively holds said ring and the rest of said coupler guard to said hinge extension. An edge trim selectively sits on top of a portion of a first arm. A set screw selectively adjusts a fit of said ring with respect to said hinge extension.

BRIEF DESCRIPTION OF THE SEVERAL VIEWS OF THE DRAWING

FIG. 11A illustrates an elevated front side view of ring 410.
FIG. 11B illustrates an elevated first side view of ring 410.
FIG. 12A illustrates an elevated front side view of ring 410.
FIG. 12B illustrates an elevated front side view of notches 1102.

DETAILED DESCRIPTION OF THE INVENTION

Figure 1:
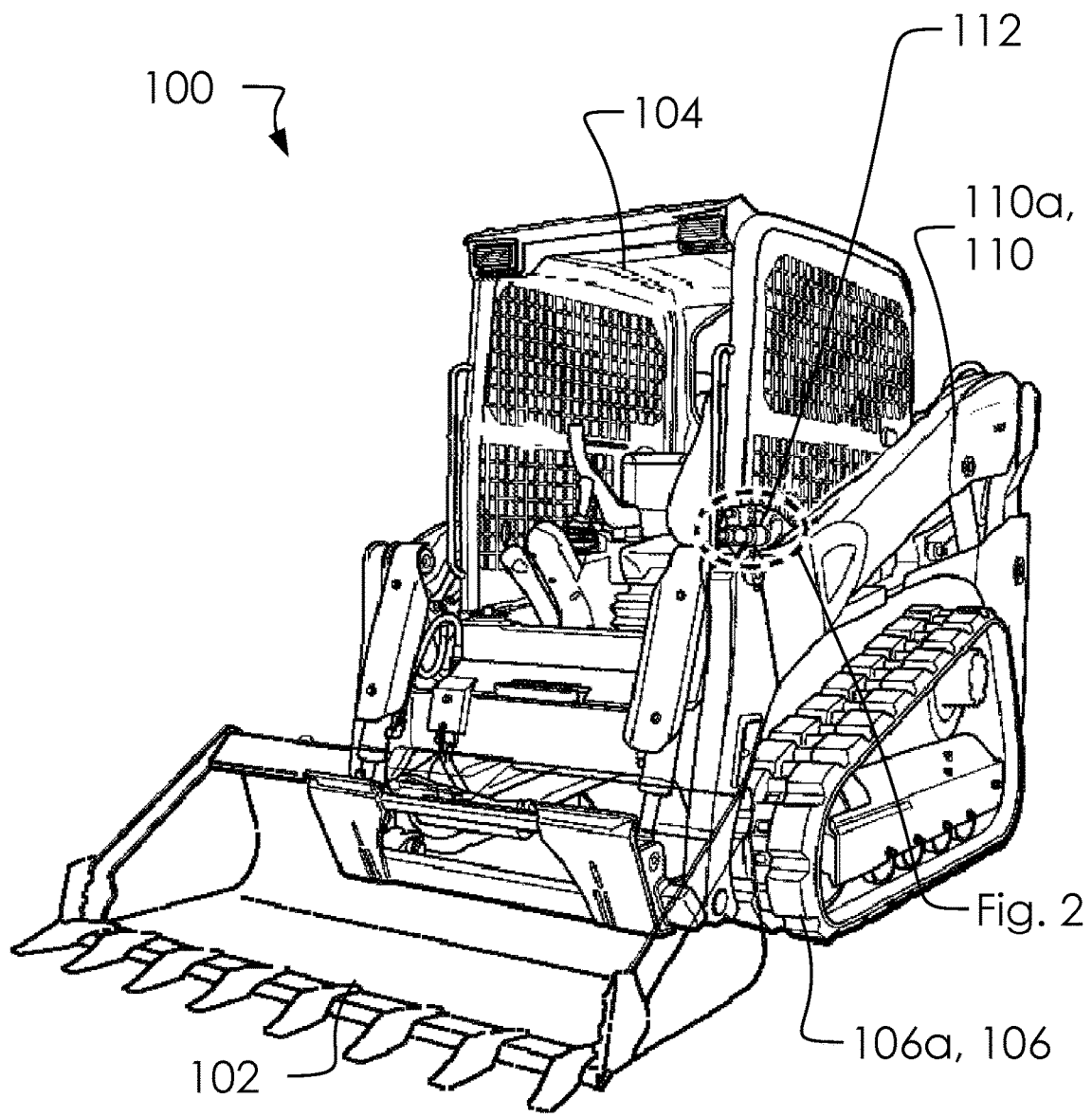
FIG. 1 illustrates a perspective overview view of loader 100.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

These parts are illustrated in the figures and discussed below:
a loader 100
A bucket assembly 102
A cab 104
A one or more track assemblies 106
A first track assembly 106*a*
A second track assembly 106*b*
A one or more arms 110
A first arm 110*a*
A second arm 110*b*
An aux coupler assembly 112
A small male coupler 200
A small female coupler 202
A male case drain coupler 204
A larger female coupler 206
A large male coupler 208
An enclosed cab 210
A hinge extension 212
A one or more couplers 214
A one or more embodiments 300
A first embodiment 300*a*
A second embodiment 300*b*
A coupler guard 400

An encasement 402
A side plate 404
An edge trim 406
One or more screw assemblies 408
A first screw assembly 408a
A second screw assembly 408b
A third screw assembly 408c
A ring 410
A ring screw assembly 412
A set screw 414
A ring notch 700
A one or more fastener apertures 702
A first fastener aperture 702a
A second fastener aperture 702b
A third fastener aperture 702c
A lower front edge 704
An upper front edge 706
A side body 708
A lower edge 710
A slot 800
An unbent configuration 900
A one or more fastener apertures 902
A first fastener aperture 902a
A second fastener aperture 902b
A third fastener aperture 902c
A bend line 904
A bend line 906
An exterior portion 908
A top portion 910
An interior portion 912
A bent configuration 1000
A notches 1102
A first notch 1102a
A second notch 1102b
A set screw apertures 1104
A first set screw aperture 1104a
A second set screw aperture 1104b
An internal diameter 1106

FIG. 1 illustrates a perspective overview view of loader 100.

In one embodiment, said loader 100 can comprise said bucket assembly 102, said cab 104, said second arm 110b and said aux coupler assembly 112.

In one embodiment, said one or more track assemblies 106 can comprise said first track assembly 106a and said second track assembly 106b.

In one embodiment, said one or more arms 110 can comprise said first arm 110a and said second arm 110b.

In one embodiment, said loader 100 can comprise a compact track loader or a skid loader, as is known in the art.

Figure 2A:
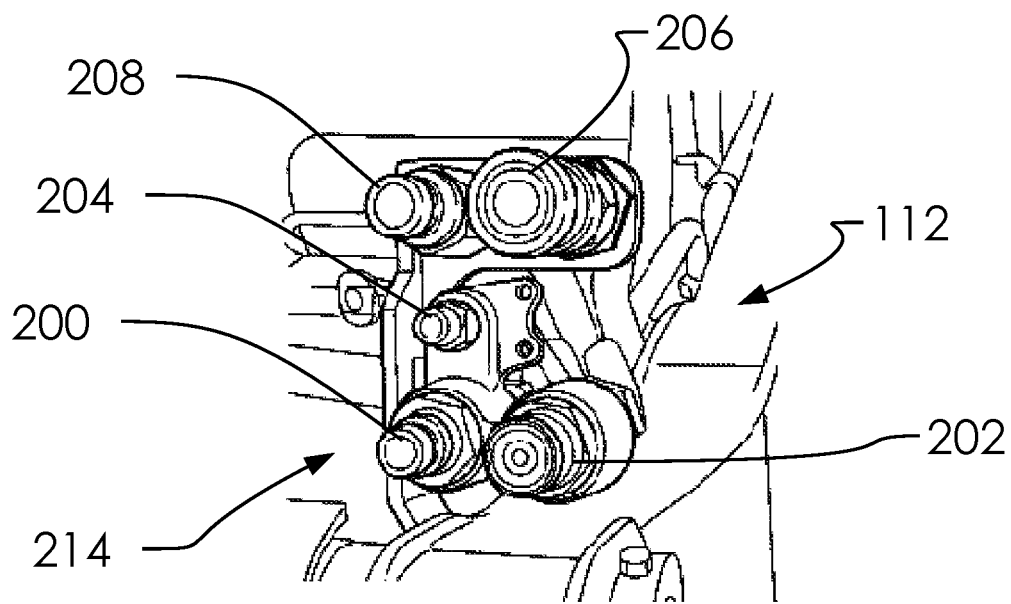
FIG. 2A illustrates a perspective detailed view of aux coupler assembly 112.

FIG. 2A illustrates a perspective detailed view of aux coupler assembly 112.

Figure 2B:
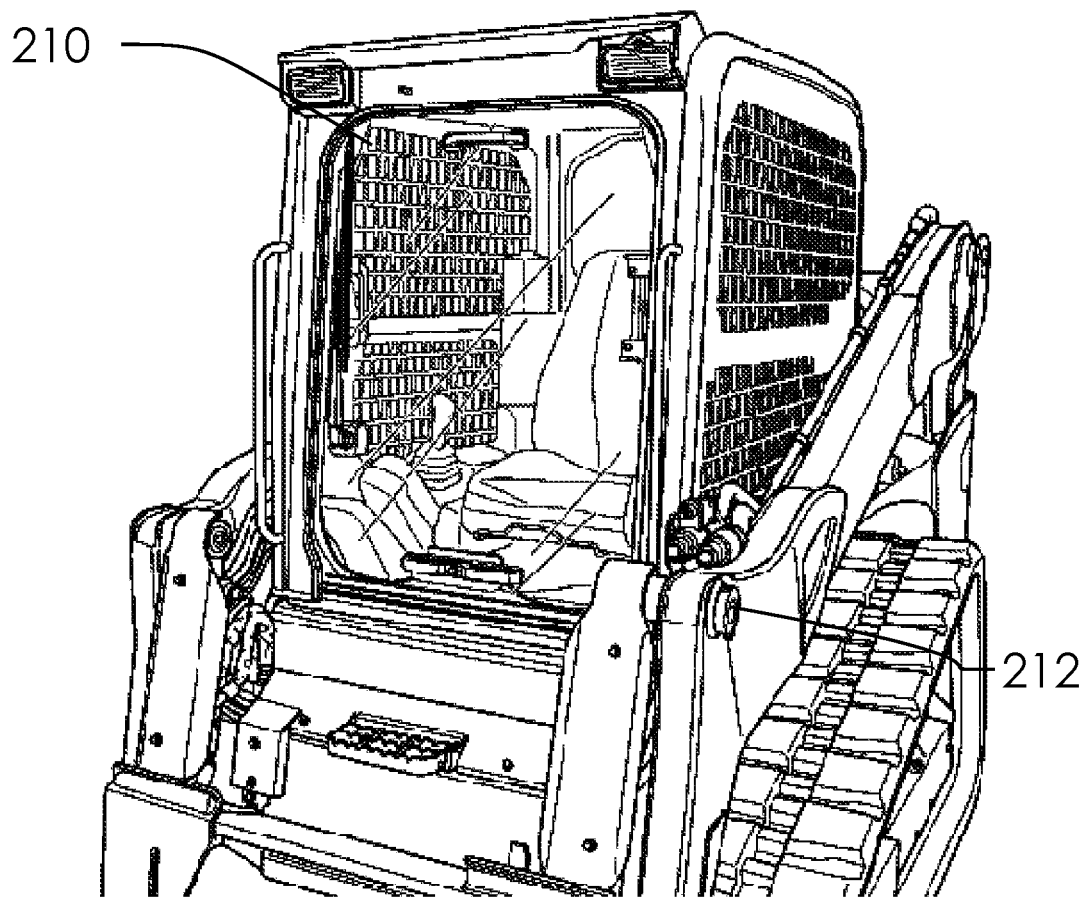
FIG. 2B illustrates a perspective (none) view of enclosed cab 210.

FIG. 2B illustrates a perspective (none) view of enclosed cab 210.

In one embodiment, said loader 100 can comprise said enclosed cab 210 and said hinge extension 212.

In one embodiment, said aux coupler assembly 112 can comprise said small male coupler 200, said small female coupler 202, said male case drain coupler 204, said larger female coupler 206, said large male coupler 208 and said one or more couplers 214.

In one embodiment, said aux coupler assembly 112 can comprise said one or more couplers 214 being arranged above and moving relative to one among said one or more arms 110. In one embodiment, said aux coupler assembly 112 can be at a proximal end of said aux coupler assembly 112 nearest said cab 104, as illustrated.

Referring to the operational manual for a common manufacturer of said loader 100, it is noted that said aux coupler assembly 112 suffers from dirt and debris on all of said one or more couplers 214. Owners are warned to visually check said one or more couplers 214 for corroding, cracking, damage and excessive wear. In case of damage to any of said one or more couplers 214 they must be replaced. Owners are further warned to use long enough hoses when connecting to said aux coupler assembly 112, otherwise said one or more couplers 214 could be damage due to frequent side load and impacts. Owners are further warned not to use their hands when checking for leaks. When using a high flow model (illustrated below), owners are further warned to not exceed the rated operating capacity of the unit, as exceeding such capacity can cause hydraulic imbalance with other operational commands (such as "lift arms raise", "bucket roll back" or "auxiliary hydraulic control"). Accordingly, damage to or lack of care for said one or more couplers 214 can lead to poor performance of said loader 100 such a causing said one or more arms 110 to lower slowly. Further, operators are warned that failing to follow these instructions can lead to personal injury or death.

Figure 3A:
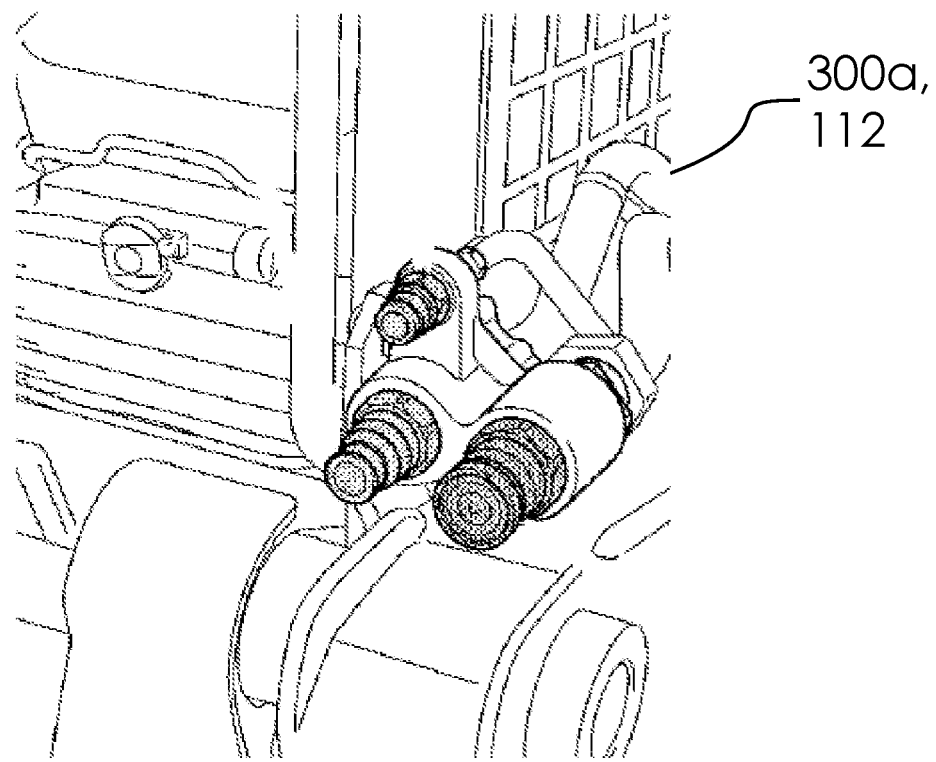
FIG. 3A illustrates a perspective overview of aux coupler assembly 112 as a low flow model.

FIG. 3A illustrates a perspective overview of aux coupler assembly 112 as a low flow model.

Figure 3B:
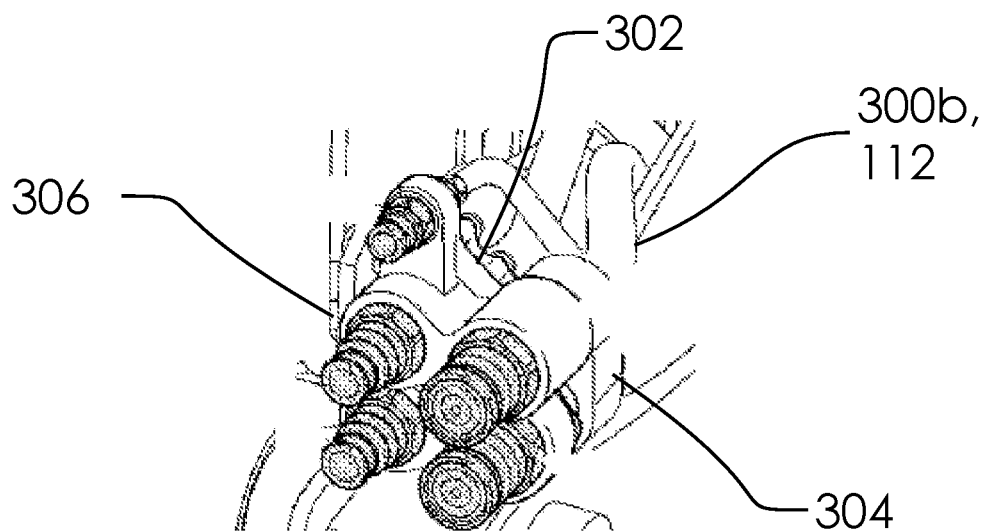
FIG. 3B illustrates a perspective overview of aux coupler assembly 112 as a high flow model.

FIG. 3B illustrates a perspective overview of aux coupler assembly 112 as a high flow model.

In one embodiment, said one or more embodiments 300 can comprise said first embodiment 300a and said second embodiment 300b.

In one embodiment, said aux coupler assembly 112 can comprise said one or more embodiments 300.

Said loader 100 can comprise variations on said aux coupler assembly 112, as illustrated and known in the art. Further, said aux coupler assembly 112 can comprise a top side 302, a first side 304 and a second side 306, as illustrated.

Figure 4:
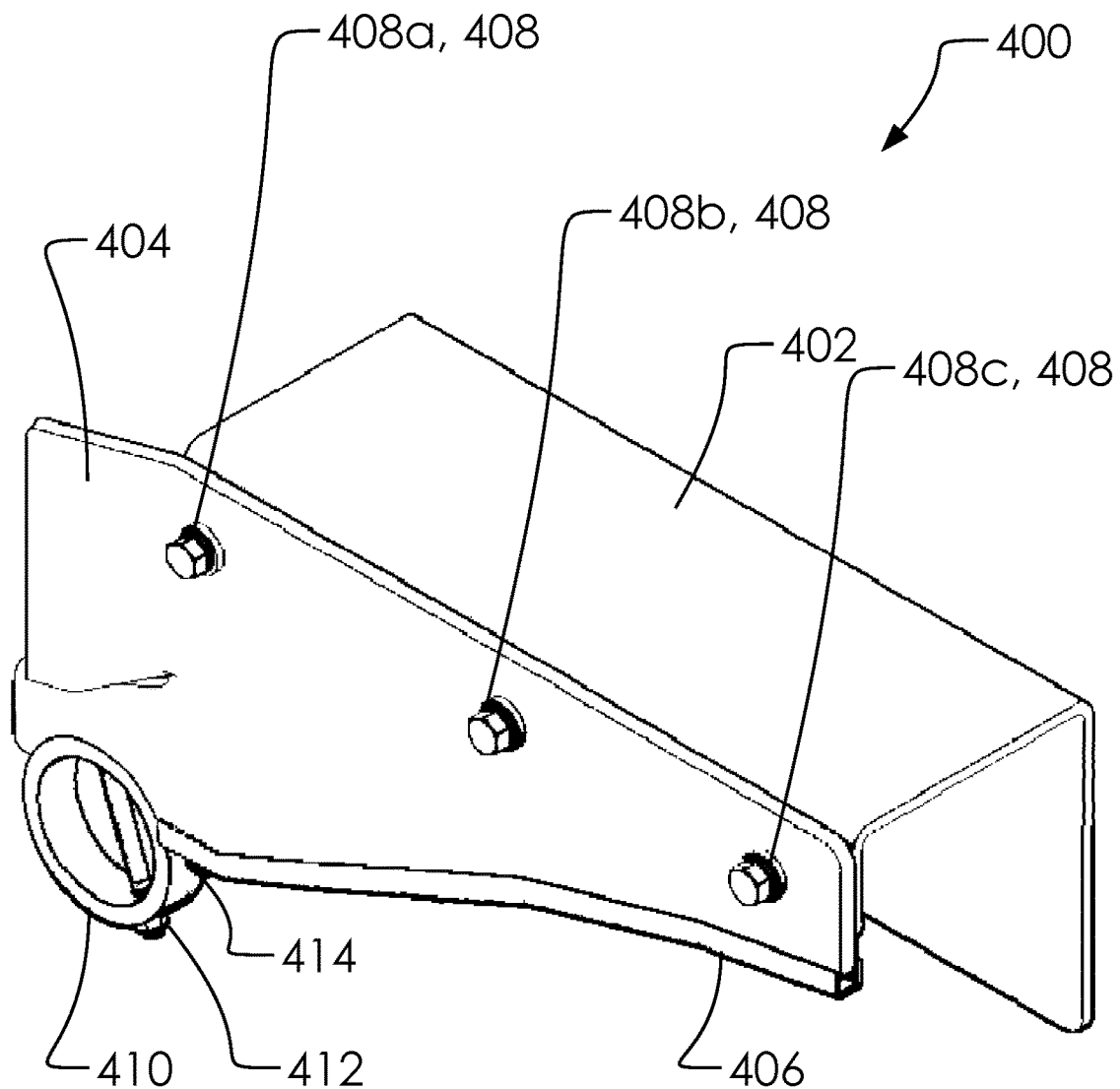
FIG. 4 illustrates a perspective overview of coupler guard 400.

FIG. 4 illustrates a perspective overview of coupler guard 400.

In one embodiment, said coupler guard 400 can comprise said encasement 402, said side plate 404, said edge trim 406, said edge trim 406, said screw assemblies 408, said ring 410, said ring screw assembly 412 and said set screw 414.

In one embodiment, said screw assemblies 408 can comprise said first screw assembly 408a, said second screw assembly 408b and said third screw assembly 408c.

In one embodiment, said aux coupler assembly 112 can comprise said set screw 414.

In one embodiment, said encasement 402 and said side plate 404 can be configured to protect said aux coupler assembly 112 from side impacts in the rough work environment of said loader 100. In one embodiment, said encasement 402 can wrap around a top portion and interior side of said aux coupler assembly 112; said side plate 404 can attach to a portion of said encasement 402 and protect an exterior side portion of said aux coupler assembly 112; said screw assemblies 408 can selectively attach said encasement 402 to said side plate 404; said ring 410 can be attached to a portion of said side plate 404; said ring 410 can selectively wrap around a portion of said hinge extension 212 of said loader 100; said ring screw assembly 412 can selectively hold said ring 410 and the rest of said coupler guard 400 to said hinge extension 212; said edge trim 406 can selectively sit on top of a portion of said first arm 110a; and said set screw 414 can selectively adjust a fit of said ring 410 with respect to said hinge extension 212.

Figures 5A, 5B:
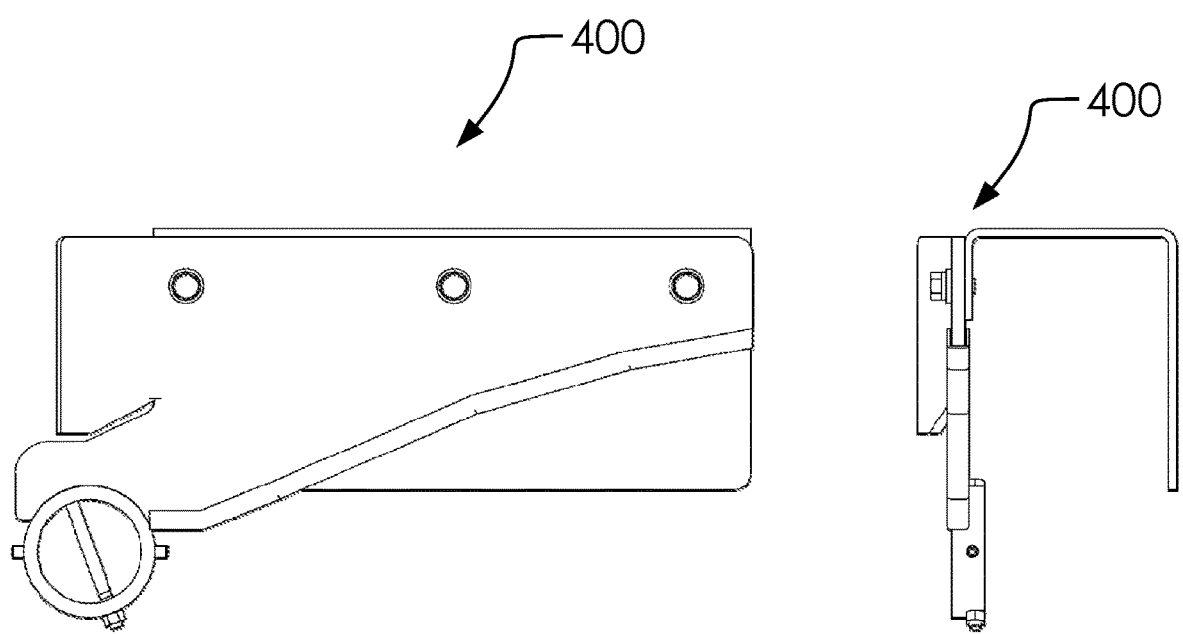
FIG. 5A illustrates an elevated front side view of coupler guard 400.
FIG. 5B illustrates an elevated first side view of coupler guard 400.

FIG. 5A illustrates an elevated front side view of coupler guard 400.

FIG. 5B illustrates an elevated first side view of coupler guard 400.

Figure 6:
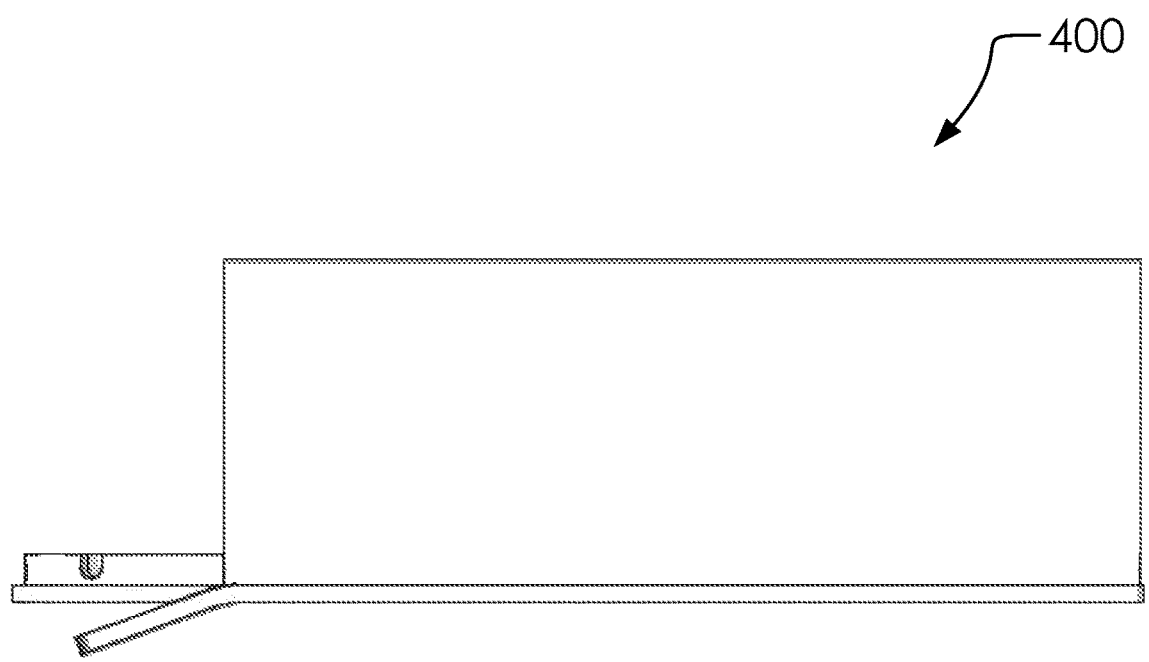
FIG. 6 illustrates an elevated top side view of coupler guard 400.

FIG. 6 illustrates an elevated top side view of coupler guard 400.

In one embodiment, said coupler guard 400 can protect said aux coupler assembly 112 from strikes from above with portions of said encasement 402 and said side plate 404.

Figure 7A:
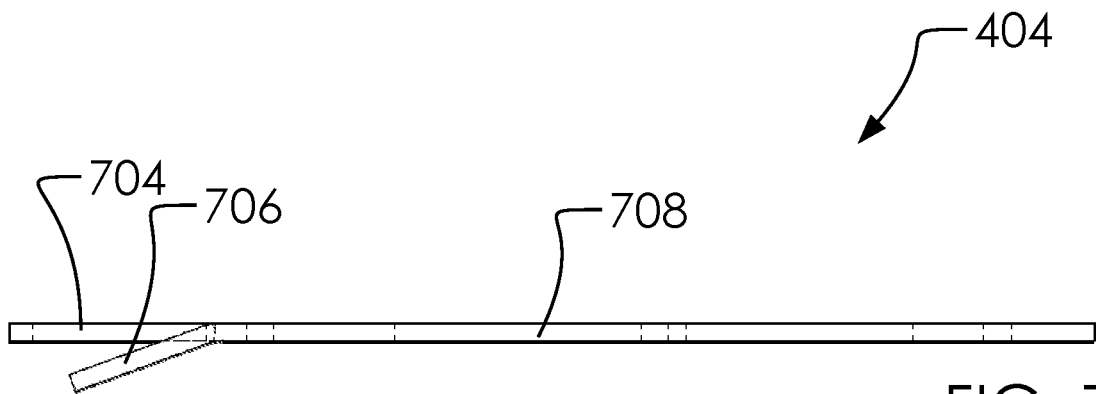
FIG. 7A illustrates an elevated top side view of side plate 404.

FIG. 7A illustrates an elevated top side view of side plate 404.

Figure 7B:
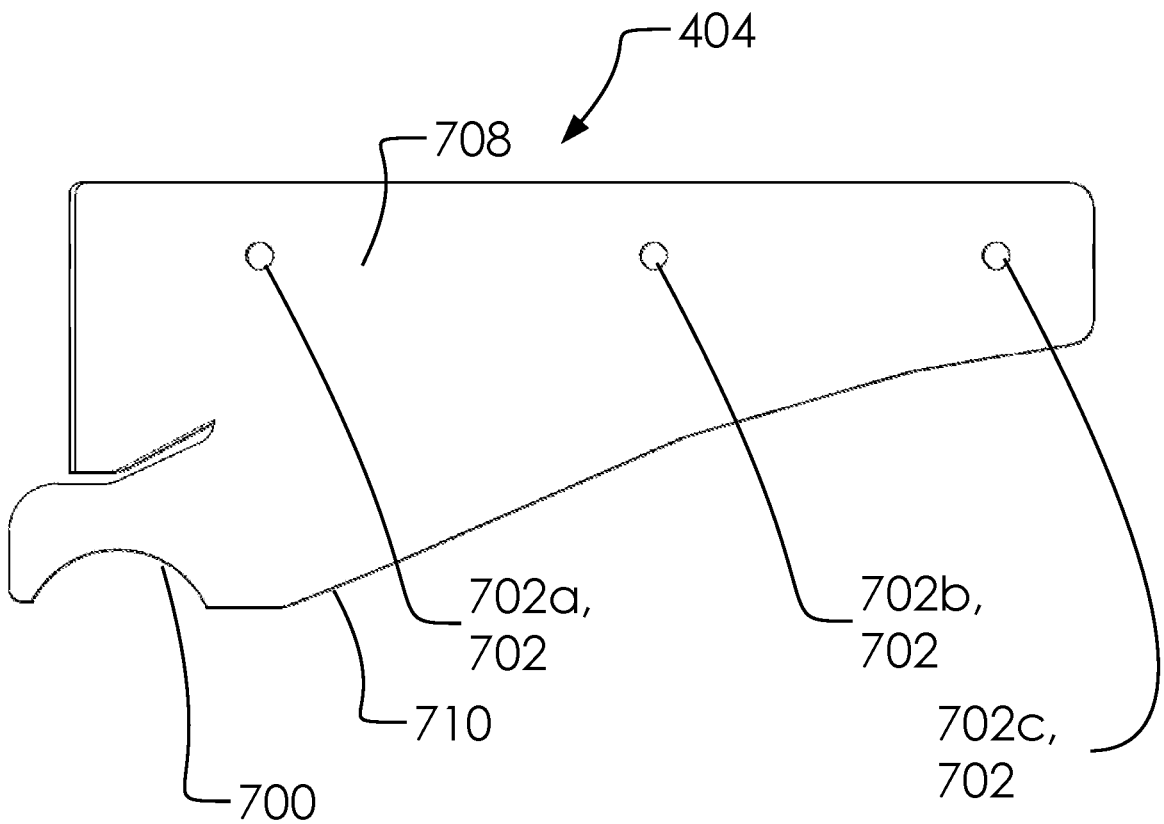
FIG. 7B illustrates an elevated front side view of side plate 404.

FIG. 7B illustrates an elevated front side view of side plate 404.

In one embodiment, said one or more fastener apertures 702 can comprise said first fastener aperture 702a, said second fastener aperture 702b and said third fastener aperture 702c.

In one embodiment, said side plate 404 can comprise said ring notch 700, said ring notch 700, said one or more fastener apertures 702, said lower front edge 704, said upper front edge 706, said side body 708 and said lower edge 710.

In one embodiment, said lower front edge 704 can comprise a straight portion of said side body 708 being substantially planar with the rest of aid side body 708. In one embodiment, said upper front edge 706 can comprise a portion of said side body 708 being bent slightly outward to accommodate portions of said aux coupler assembly 112, as necessary.

Figure 8A:
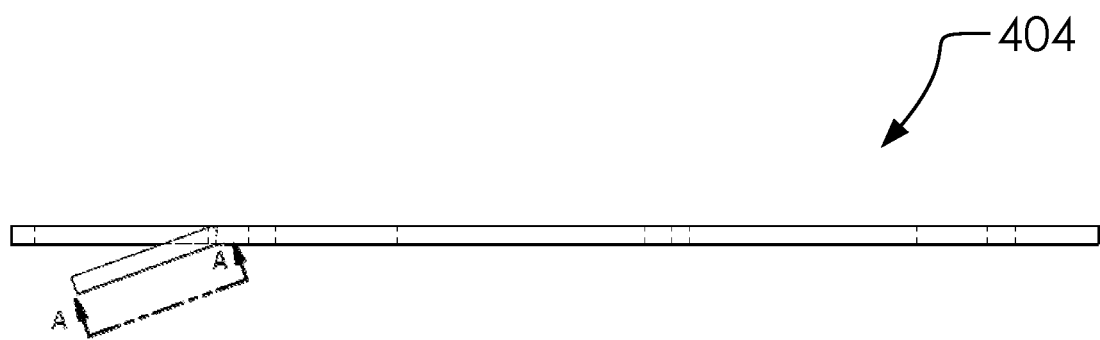
FIG. 8A illustrates an elevated top side view of side plate 404.

FIG. 8A illustrates an elevated top side view of side plate 404.

Figure 8B:
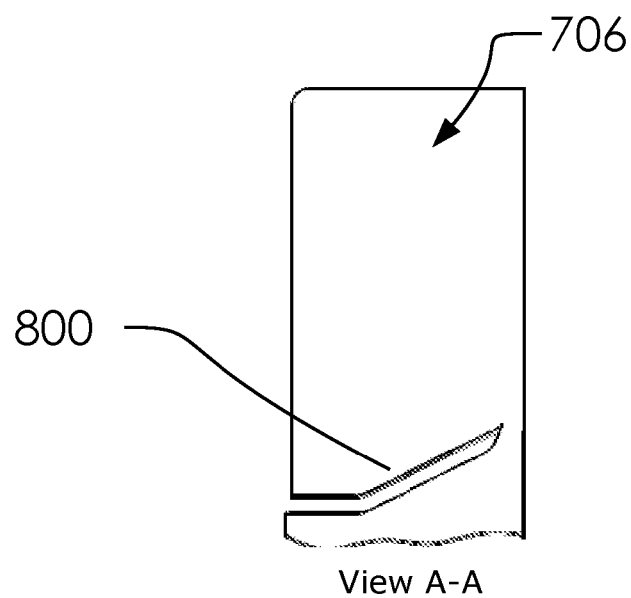
FIG. 8B illustrates an elevated front side view of upper front edge 706 at view A-A.

FIG. 8B illustrates an elevated front side view of upper front edge 706 at view A-A.

In one embodiment, said upper front edge 706 can comprise said slot 800.

In one embodiment, said upper front edge 706 can comprise a portion of said side body 708 being cut apart from said lower front edge 704 at said slot 800 and bent outward, as illustrated.

Figure 9:
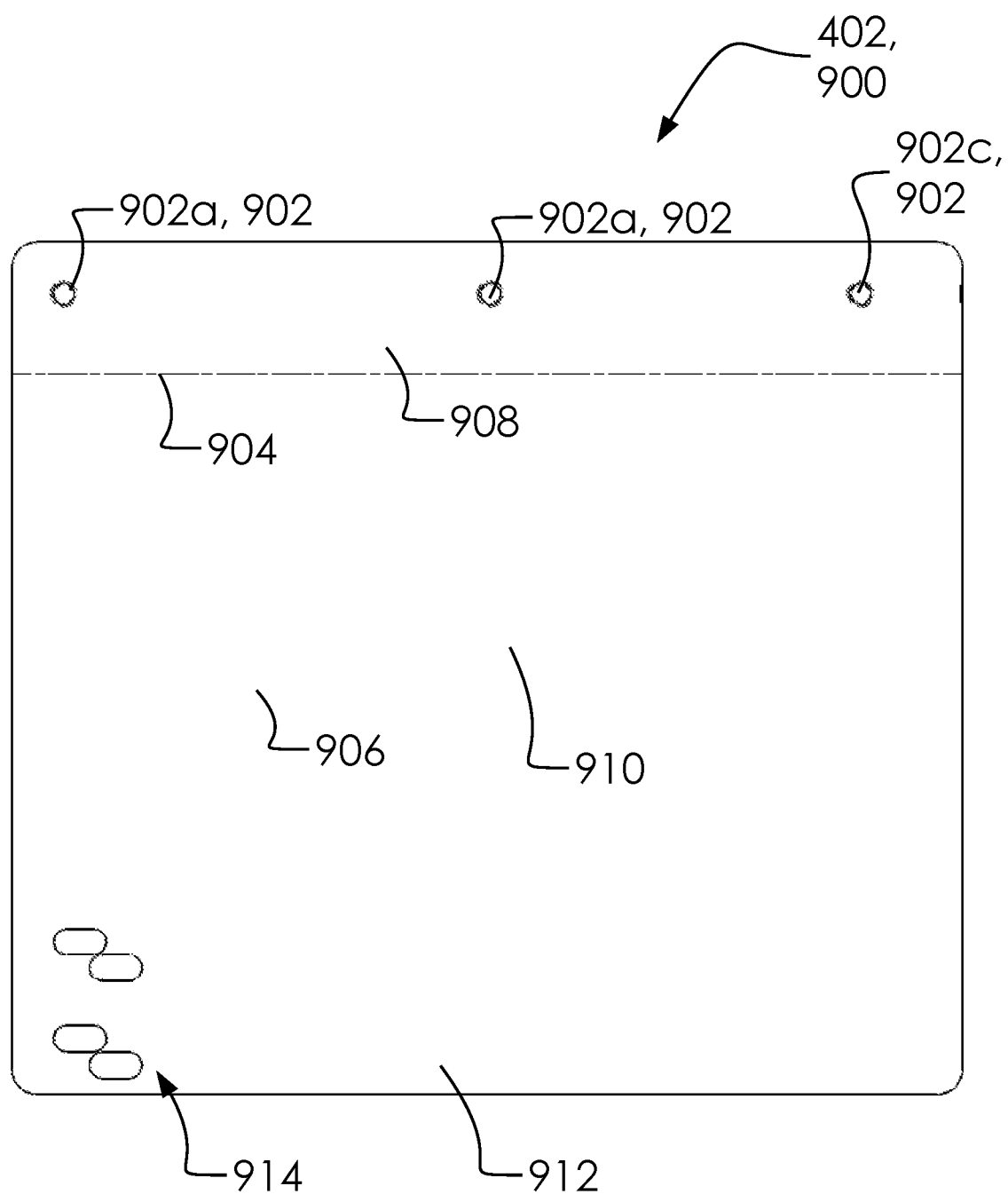
FIG. 9 illustrates an elevated top side view of unbent configuration 900 of said encasement 402.

FIG. 9 illustrates an elevated top side view of unbent configuration 900 of said encasement 402.

In one embodiment, said one or more fastener apertures 902 can comprise said first fastener aperture 902a, said second fastener aperture 902b and said third fastener aperture 902c.

In one embodiment, said encasement 402 can comprise said unbent configuration 900, said unbent configuration 900, said one or more fastener apertures 902, said bend line 904, said bend line 906, said exterior portion 908, said top portion 910 and said interior portion 912.

In one embodiment, said one or more fastener apertures 902 can selectively attach to said one or more fastener apertures 702 with said screw assemblies 408, as is known in the art.

Figure 10:
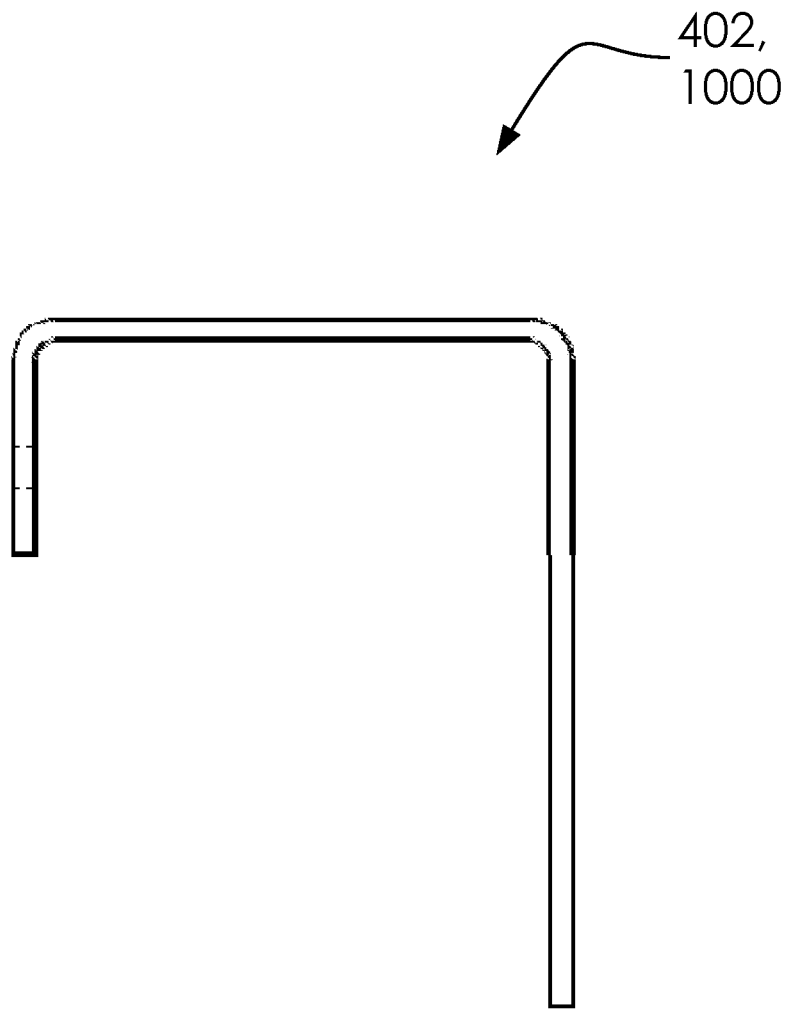
FIG. 10 illustrates an elevated first side view of bent configuration 1000 of said encasement 402.

FIG. 10 illustrates an elevated first side view of bent configuration 1000 of said encasement 402.

In one embodiment, said encasement 402 can comprise said bent configuration 1000.

In one embodiment, said ring 410 can comprise said bent configuration 1000.

FIG. 11A illustrates an elevated front side view of ring 410.

FIG. 11B illustrates an elevated first side view of ring 410.

In one embodiment, said notches 1102 can comprise said first notch 1102a and said second notch 1102b.

In one embodiment, said set screw apertures 1104 can comprise said first set screw aperture 1104a and said second set screw aperture 1104b.

In one embodiment, said ring 410 can comprise said notches 1102, said second notch 1102b, said set screw apertures 1104 and said internal diameter 1106.

In one embodiment, said internal diameter 1106 can be suited to fit around portions of said hinge extension 212 of said loader 100.

FIG. 12A illustrates an elevated front side view of ring 410.

FIG. 12B illustrates an elevated front side view of notches 1102.

In one embodiment, a portion of said ring screw assembly 412 fit through a portion of said notches 1102.

In another embodiment, a portion of said set screw apertures 1104 fit through a portion of said notches 1102

The following sentences are included for completeness of this disclosure with reference to the claims.

A coupler guard 400 configured to protect an aux coupler assembly 112 from side impacts in the rough use environment of a loader 100. Said coupler guard 400 comprises an encasement 402 and a side plate 404. Said loader 100 comprises said aux coupler assembly 112 and a hinge extension 212. Said encasement 402 wraps around a top portion and interior side of said aux coupler assembly 112. Said side plate 404 attaches to a portion of said encasement 402 and protect an exterior side portion of said aux coupler assembly 112. A screw assemblies 408 selectively attaches said encasement 402 to said side plate 404. A ring 410 attaches to a portion of said side plate 404. Said ring 410 selectively wraps around a portion of said hinge extension 212 of said loader 100. A ring screw assembly 412 selectively holds said ring 410 and the rest of said coupler guard 400 to said hinge extension 212. An edge trim 406 selectively sits on top of a portion of a first arm 110a. A set screw 414 selectively adjusts a fit of said ring 410 with respect to said hinge extension 212.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A coupler guard configured to protect an aux coupler assembly of a loader from side impacts in the rough use environment, wherein:
    said coupler guard comprises an encasement and a side plate;
    said coupler guard is configured attach to a portion of said loader and to wrap around and protect
        a top side and a first side of said aux coupler assembly with said encasement,
        a second side of said aux coupler assembly with said side plate;
    said coupler guard attaches to said loader by attaching a portion of said side plate to a hinge extension of said loader;
one or more screw assemblies selectively attach said side plate to a portion of said loader;
said coupler guard further comprises a ring comprising a cylindrical element having open ends at either end of said cylindrical element's shape;
said ring slides over said hinge extension to hold a portion of said coupler guard against a portion of said loader;
said one or more screw assemblies comprises a first screw assembly, a second screw assembly and a third screw assembly;
said one or more screw assemblies selectively attach said coupler guard to a portion of said loader;
said set screw is configured to selectively adjust a fit of said ring with respect to said hinge extension;
said coupler guard further comprises an edge trim aligned with a lower edge of said side plate; and
said edge trim is configured to selectively sit on top of a portion of said loader.

2. The coupler guard of claim 1, wherein:
a ring screw assembly selectively holds said ring and the rest of said coupler guard to said hinge extension; and
a set screw selectively adjusts a fit of said ring with respect to said hinge extension.

3. The coupler guard of claim 1, wherein:
said ring located at a lower front portion of said side plate of said coupler guard.

4. The coupler guard of claim 1, wherein:
said side plate comprises a lower front edge, an upper front edge, a side body and said lower edge;
said lower front edge comprises a straight portion of said side body being substantially planar with the rest of said side body; and
said upper front edge comprises a portion of said side body being bent slightly outward to accommodate portions of an aux coupler assembly, as necessary.

5. A coupler guard configured to protect an aux coupler assembly of a loader from side impacts in the rough use environment, wherein:
said coupler guard comprises an encasement and a side plate;
said coupler guard is configured attach to a portion of said loader and to wrap around and protect
a top side and a first side of said aux coupler assembly with said encasement, and
a second side of said aux coupler assembly with said side plate;
said coupler guard attaches to said loader by
attaching a portion of said side plate to a hinge extension of said loader;
one or more screw assemblies selectively attach said side plate to a portion of said loader;
said coupler guard further comprises a ring comprising a cylindrical element having open ends at either end of said cylindrical element's shape;
said ring slides over said hinge extension to hold a portion of said coupler guard against a portion of said loader;
a ring screw assembly selectively holds said ring and the rest of said coupler guard to said hinge extension; and
a set screw selectively adjusts a fit of said ring with respect to said hinge extension.

* * * * *